UNITED STATES PATENT OFFICE.

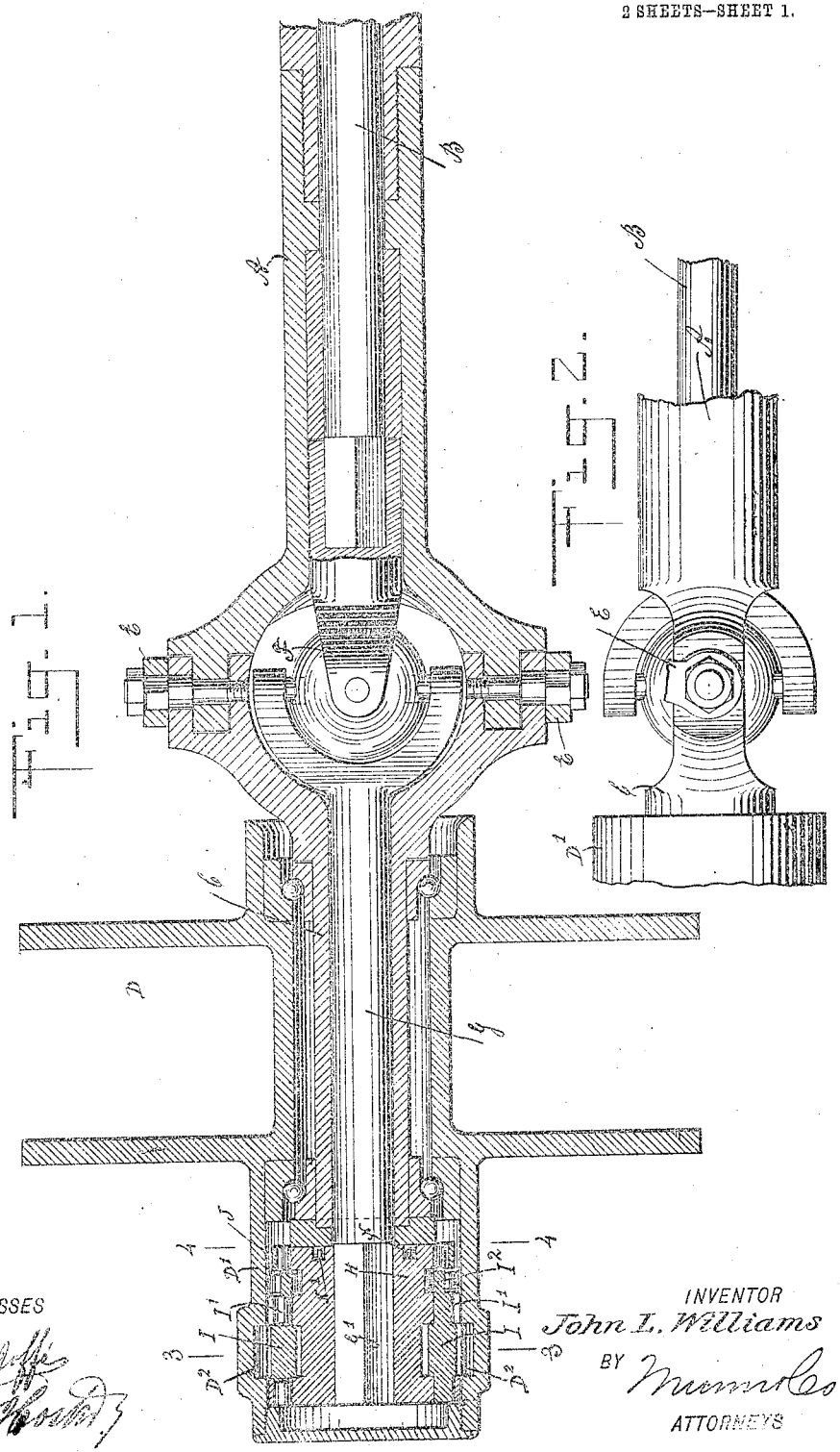

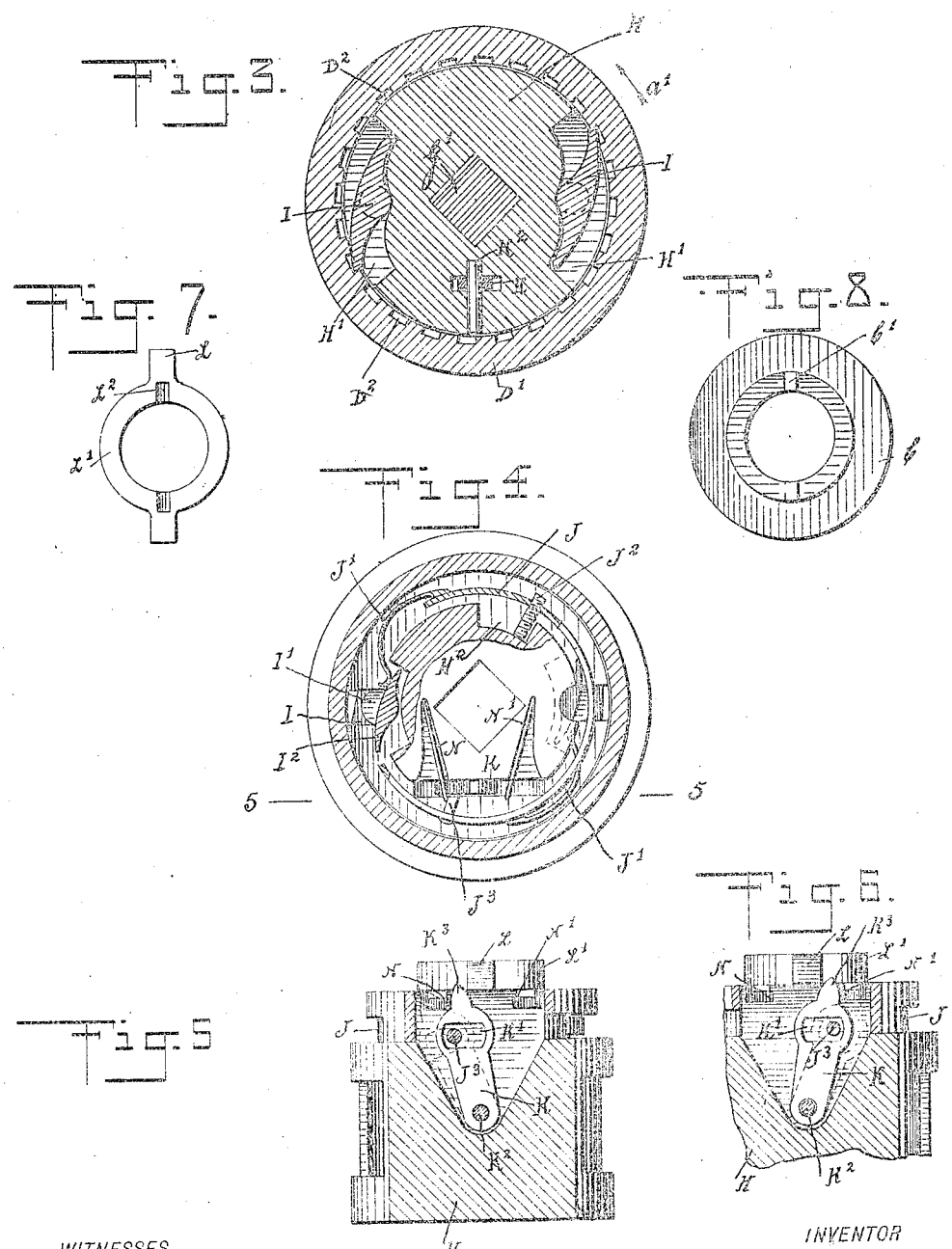

JOHN LEONIDAS WILLIAMS, OF ELLZEY, FLORIDA.

POWER TRANSMISSION.

No. 893,409.  Specification of Letters Patent.  Patented July 14, 1908.

Application filed August 31, 1907. Serial No. 390,951.

*To all whom it may concern:*

Be it known that I, JOHN LEONIDAS WILLIAMS, a citizen of the United States, and a resident of Ellzey, in the county of Levy and State of Florida, have invented a new and Improved Power Transmission, of which the following is a full, clear, and exact description.

The invention relates to automobiles and other power-driven vehicles, and its object is to provide a new and improved power transmission, arranged to drive the vehicle wheels forward or backward, and to allow the driven wheels of the front or rear axle to turn independent one of the other when steering the machine around corners, thus relieving the driving shaft of all undue strain.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a longitudinal sectional elevation of the improvement as applied to the front axle of a power-driven vehicle; Fig. 2 is a plan view of the joints between the main axle and its stub and drive shaft and its stub axle; Fig. 3 is an enlarged transverse section of the improvement on the line 3—3 of Fig. 1; Fig. 4 is a similar view of the same on the line 4—4 of Fig. 1; Fig. 5 is a sectional plan view of the same on the line 5—5 of Fig. 4; Fig. 6 is a like view of the same showing the parts in a different position; Fig. 7 is a face view of the ring on the end of the stub axle, and Fig. 8 is an end elevation of the stub axle.

The main axle A is provided with bearings for the drive shaft B connected by sprocket wheels and chain or other devices with the motor, so as to allow of rotating the shaft B, in either a forward or backward direction. The main axle A is provided with a stub axle C, on which is journaled the vehicle wheel D, the said stub axle C being connected at its pivot with the usual steering gear E, to allow of steering the stub axle C in the desired direction for properly steering the vehicle.

Each end of the drive shaft B is connected by a universal joint F with a stub shaft G journaled in the stub axle C and terminating in a polygonal end G', on which is secured a sleeve H fitting in the outer end of the hub D' of the vehicle wheel D. On the inside of the hub D' are formed teeth $D^2$ adapted to be engaged by one or more double pawls I extending in the recesses H' formed in the peripheral face of the sleeve H (see Fig. 3), each pawl I having its pivot I' journaled in suitable bearings arranged in the sleeve H. On the pivot I' of each pawl I is secured a shifting arm $I^2$, adapted to be engaged by a spring J' attached to a shifting ring J, mounted to turn loosely on the inner end of the sleeve H. The shifting ring J is provided with a stop pin $J^2$ extending into a recess $H^2$ formed on the sleeve H (see Fig. 4), to limit the turning motion of the shifting ring J. The shifting ring J is also provided with a pin $J^3$ extending into an elongated aperture K' formed in the shifting lever K, pivoted at $K^2$ on the sleeve H, as plainly indicated in Figs. 5 and 6. The free end $K^3$ of the shifting lever K is adapted to be engaged by one or more projections L, formed on the ring L', provided with recesses $L^2$ (see Fig. 7), into which extend lugs C' formed on the outer end of the stub axle C (see Figs. 1 and 8), to hold the ring L in place on the stub axle C. Springs N and N' attached to the sleeve H are adapted to press opposite sides of the free end $K^3$ of the lever K, to prevent the latter from being swung out of position by the projection L.

The operation is as follows: When the several parts are in the position illustrated in Figs. 1, 3, 4 and 5, and the shaft B is rotated in a forward direction, then the stub shaft G and the sleeve H turn with the shaft B, and the pawls I, by engaging the teeth $D^2$ turn the hub D' and the wheel D in a forward direction. When the shaft B is reversed then the projection L imparts a swinging motion to the lever K (see Fig. 6), to cause the lever K to act on the pin $J^3$ with a view to shift the ring J, so that the springs J' thereof glide from one end of the arm $I^2$ to the other end thereof, thus turning the corresponding pawl I, whereby the previously engaged end of pawl I is moved out of engagement with the teeth $D^2$, while the other end of the pawl I moves into engagement with the said teeth, and consequently the hub D' and the vehicle wheel D are turned in a reverse direction. It is understood that as the projections L are stationary on the stationary stub axle C it is evident that whenever the sleeve H is turned in either direction, the lug L acts on the free end K³ of the lever K, to swing the latter from one side to the other, to shift the ring J forward or backward, to turn the pawls I correspondingly, for turning the hub D' and the wheel D in the corresponding directions. By the use of the springs N and N' the lever K yields to allow the free end K³ of the lever K to pass the lug L when the shaft B is turned in either a forward or a backward direction.

By the arrangement described both wheels on the front or rear axle are positively driven in either a forward or backward direction from the motor, but each wheel on the front or rear axle is free to turn independent of the other, thus allowing one wheel to turn faster than the other when steering the vehicle around a corner, so that the shaft B and wheel tires are relieved of all undue strain. It will also be noticed that the driving shaft B is relieved of the weight of the machine and hence the shaft B can be readily driven with comparatively little power.

Although the power transmission is shown for use on the front axle, it is evident that it can be readily applied on a rear axle in which the joints, stub shaft and stub axle are omitted.

Having thus described my invention, I claim as new and desire to secure by Letters Patent:

1. A power transmission for vehicles, comprising the vehicle wheel provided with a hub having internally arranged teeth, an axle, a stub axle pivoted to the end of the axle and on which the wheel is journaled, a driving shaft in the axle, a stub shaft connected by universal joint with the end of the driving shaft, the free end of said stub shaft being polygonal in cross section, a sleeve fitting on the end of the stub shaft, pawls provided with pivot pins journaled in the sleeve, a shifting arm in connection with the pivot of each pawl, a shifting ring encircling the sleeve, and provided with springs for engaging the shifting arm at different points whereby to reverse the engagement of the pawl with the teeth of the hub, a stop pin for limiting the motion of the ring, a shifting lever provided with a slot, a pin on the ring for engaging the slot, a ring provided with projections connected with the stub axle, and springs for limiting the motion of the said shifting lever.

2. A power transmission for vehicles, comprising the vehicle wheel provided with a hub having internally arranged teeth, an axle on which the wheel is journaled, a driving shaft in the axle and having its free end polygonal in cross section, a sleeve fitting on the end of the driving shaft, pawls provided with pivot pins journaled in the sleeve, a shifting arm in connection with the pivot of each pawl, a shifting ring encircling the sleeve, and provided with springs for engaging the shifting arm at different points whereby to reverse the engagement of the pawl with the teeth of the hub, a stop pin for limiting the motion of the ring, a shifting lever engaging the ring, and means rigid with the axle for operating the shifting lever.

3. A power transmission for vehicles, comprising the vehicle wheel provided with a hub having internally arranged teeth, an axle on which the wheel is journaled, a driving shaft in the axle and having its free end polygonal in cross section, a sleeve fitting on the end of the driving shaft, pawls provided with pivot pins journaled in the sleeve, a shifting arm in connection with the pivot of each pawl, a shifting ring encircling the sleeve, and provided with springs for engaging the shifting arm at different points whereby to reverse the engagement of the pawl with the teeth of the hub, and means connected with the axle for shifting the ring when the movement of the driving shaft is reversed.

4. A power transmission for vehicles, comprising the vehicle wheel provided with a hub having internally arranged teeth, an axle on which the wheel is journaled, a driving shaft in the axle and having its free end polygonal in cross section, a sleeve fitting on the end of the driving shaft, pawls journaled in the sleeve and engaging the teeth of the hub, a shifting arm in connection with each pawl, a shifting ring encircling the sleeve and provided with springs for engaging the shifting arm at different points whereby to reverse the engagement of the pawl, and means in connection with the axle for operating the shifting ring to reverse the pawls when the motion of the driving shaft is reversed.

5. A power transmission for vehicles, comprising a vehicle wheel, a drive shaft, a fixed axle for the drive shaft and wheel to turn on independent one of the other, a ratchet mechanism connecting the said drive shaft with the said vehicle wheel and having a double pawl for engagement with teeth on the hub of the vehicle wheel, a tripping arm on the pivot of the said pawl, a ring mounted to turn and having means for engaging the said tripping arm to swing the pawl in either direction, a spring-pressed shifting arm engaging the said ring for shifting the latter, and a projection on the said axle for engaging the said shifting arm.

In testimony whereof I have signed my name to this specification in the presence of two subscribing witnesses.

JOHN LEONIDAS WILLIAMS.

Witnesses:
  BERRY CANNON,
  CHARLES L. TINDAL.